United States Patent
Hari

(10) Patent No.: US 10,977,083 B2
(45) Date of Patent: Apr. 13, 2021

(54) COST OPTIMIZED DYNAMIC RESOURCE ALLOCATION IN A CLOUD INFRASTRUCTURE

(71) Applicant: Ravi Hari, Bangalore (IN)

(72) Inventor: Ravi Hari, Bangalore (IN)

(73) Assignee: Intuit Inc., Mountain View, CA (US)

( * ) Notice: Subject to any disclaimer, the term of this patent is extended or adjusted under 35 U.S.C. 154(b) by 316 days.

(21) Appl. No.: 16/117,722

(22) Filed: Aug. 30, 2018

(65) Prior Publication Data

US 2020/0073717 A1 Mar. 5, 2020

(51) Int. Cl.
| | |
|---|---|
| G06F 9/455 | (2018.01) |
| G06F 9/50 | (2006.01) |
| G06Q 30/02 | (2012.01) |
| G06N 3/08 | (2006.01) |
| G06N 20/00 | (2019.01) |

(52) U.S. Cl.
CPC ........ *G06F 9/5027* (2013.01); *G06F 9/45558* (2013.01); *G06N 3/084* (2013.01); *G06N 20/00* (2019.01); *G06Q 30/0201* (2013.01); *G06Q 30/0206* (2013.01); *G06F 2009/4557* (2013.01)

(58) Field of Classification Search
CPC .............. G06F 9/5027; G06F 9/45558; G06F 2009/4557; G06N 20/00; G06N 3/084; G06Q 30/0201; G06Q 30/0206
See application file for complete search history.

(56) References Cited

U.S. PATENT DOCUMENTS

| | | | |
|---|---|---|---|
| 10,191,778 B1 * | 1/2019 | Yang | G06Q 30/0283 |
| 2018/0287856 A1 * | 10/2018 | Whitner | H04L 41/0695 |

OTHER PUBLICATIONS

Yusuke Sugomori et al., "Deep Learning: Practical Neural Networks with Java"; Chapter 2; Jun. 2017 (25 pages).
Sebastian Raschka et al., Python Machine Learning; Second Edition; Chapter 2; Sep. 2017 (24 pages).
Phil Kim, "MATLAB Deep Learning: With Machine Learning, Neural Networks and Artificial Intelligence"; Chapters 3-4; Jun. 15, 2017 (26 pages).
Assaad Moawad, "Neural networks and back-propagation explained in a simple way"; <https://medium.com/datathings/neural-networks-and-backpropagation-explained-in-a-simple-way-f540a3611f5e>; Published Feb. 1, 2018 (15 pages).
Amazon AWS, "What is Amazon EC2 Auto Scaling?"; <https://docs.aws.amazon.com/autoscaling/ec2/userguide/what-is-amazon-ec2-autoscaling.html>; Jul. 2018 (4 pages).

* cited by examiner

*Primary Examiner* — Emerson C Puente
*Assistant Examiner* — Jonathan R Labud
(74) *Attorney, Agent, or Firm* — Ferguson Braswell Fraser Kubasta PC

(57) ABSTRACT

A method that involves receiving budget information of a containerized application deployed with a set of containers to a set of machine instances; receiving pricing information of a list of machine instance types; receiving performance information of the set of containers; receiving an alert generated based on the performance information by comparing the performance information to a set of thresholds; generating, after receiving the alert, an output vector from a machine learning model, wherein the machine learning model uses the performance information; and adjusting a resource of the set of containers by updating a parameter based on the output vector in response to the alert, wherein the resource is controlled by the parameter, and wherein the parameter is identified in the alert.

18 Claims, 8 Drawing Sheets

|     | 726 | 728 | 730 | 732 | 734 | 736 | 738 | 740 | 742 |
| --- | --- | --- | --- | --- | --- | --- | --- | --- | --- |
| 702 | i1  | i2  | i3  | i4  | i5  | o1  | o2  | o3  | o4  |
| 704 | Processor % | Memory % | Storage % | Latency % | Traffic % | Type 1 | Type 2 | Type 3 | Type 4 |
| 706 | 0 | 0 | 0 | 0 | 0 | 0 | 0 | 0 | 0 |
| 708 | 0.5 | 0.5 | 0.4 | 0.8 | 0.6 | 0 | 0 | 0 | 0 |
| 710 | 0.6 | 0.3 | 0.7 | 0.6 | 0.5 | 0 | 0 | 0 | 0 |
| 712 | 0.8 | 0.5 | 0.3 | 0.4 | 0.6 | 1 | 0 | 0 | 0 |
| 714 | 0.4 | 0.9 | 0.4 | 0.7 | 0.8 | 1 | 0 | 0 | 0 |
| 716 | 0.5 | 0.8 | 0.8 | 0.8 | 0.8 | 0 | 0 | 0 | 0 |
| 718 | 0.6 | 0.9 | 0.95 | 0.7 | 0.8 | 1 | 1 | 0 | 0 |
| 720 | 0.8 | 0.75 | 0.75 | 0.8 | 0.7 | 0 | 0 | 0 | 0 |
| 722 | 0.95 | 0.9 | 0.95 | 0.9 | 1 | 1 | 1 | 1 | 1 |
| 724 | 1 | 1 | 1 | 1 | 1 | 1 | 1 | 1 | 1 |

Table 700

*FIG. 7*

COST OPTIMIZED DYNAMIC RESOURCE ALLOCATION IN A CLOUD INFRASTRUCTURE

BACKGROUND

Cloud provider services provide on-demand delivery of compute power, database storage, applications, etc., and other information technology resources via the internet, with pay-as-you-go pricing. Cloud provider services can provide individual services or groups of services and can dynamically scale to meet the needs of the application based on input from the developer.

Scaling is done with container-based applications by increasing or decreasing the number of containers used for the application and by deploying the containers to different types of virtual machine instances (e.g., to virtual machine instances that have more compute power, memory, storage, etc.). Container based applications use operating-system-level virtualization, also known as containerization, which is an operating system feature in which the kernel allows the existence of multiple isolated user-space instances called containers that can look like real computers from the point of view of programs running in them.

The scaling provided for by cloud provider services uses autoscaling to provision the number of containers and virtual machine instances used to deploy an application and can use the selection of different (e.g., larger) virtual machine instances. A challenge is to allocate resources used by the individual containers, which include processing power, memory, storage space, sockets, heap size, etc.

SUMMARY

In general, in one or more aspects, the invention relates to a method that involves receiving budget information of a containerized application deployed with a set of containers to a set of machine instances; receiving pricing information of a list of machine instance types; receiving performance information of the set of containers; receiving an alert generated based on the performance information by comparing the performance information to a set of thresholds; generating, after receiving the alert, an output vector from a machine learning model, wherein the machine learning model uses the performance information; and adjusting a resource of the set of containers by updating a parameter based on the output vector in response to the alert, wherein the resource is controlled by the parameter, and wherein the parameter is identified in the alert.

In general, in one aspect, embodiments are related to a system that comprises a memory coupled to a processor; a resource allocation service that executes on the processor, uses the memory, and is configured for: receiving budget information of a containerized application deployed with a set of containers to a set of machine instances; receiving pricing information of a list of machine instance types; receiving performance information of the set of containers; receiving an alert generated based on the performance information by comparing the performance information to a set of thresholds; a machine learning model that executes on the processor, uses the memory, and is configured for: generating, after receiving the alert, an output vector from a machine learning model, wherein the machine learning model uses the performance information; and the resource allocation service further configured for: adjusting a resource of the set of containers by updating a parameter based on the output vector in response to the alert, wherein the resource is controlled by the parameter, and wherein the parameter is identified in the alert.

In general, in one aspect, embodiments are related to a non-transitory computer readable medium with computer readable program code for receiving budget information of a containerized application deployed with a set of containers to a set of machine instances; receiving pricing information of a list of machine instance types; receiving performance information of the set of containers; receiving an alert generated based on the performance information by comparing the performance information to a set of thresholds; generating, after receiving the alert, an output vector from a machine learning model, wherein the machine learning model uses the performance information; and adjusting a resource of the set of containers by updating a parameter based on the output vector in response to the alert, wherein the resource is controlled by the parameter, and wherein the parameter is identified in the alert.

Other aspects of the invention will be apparent from the following description and the appended claims.

BRIEF DESCRIPTION OF DRAWINGS

FIG. 7 shows example output of a system in accordance with one or more embodiments of the invention.

DETAILED DESCRIPTION

Figure 1:
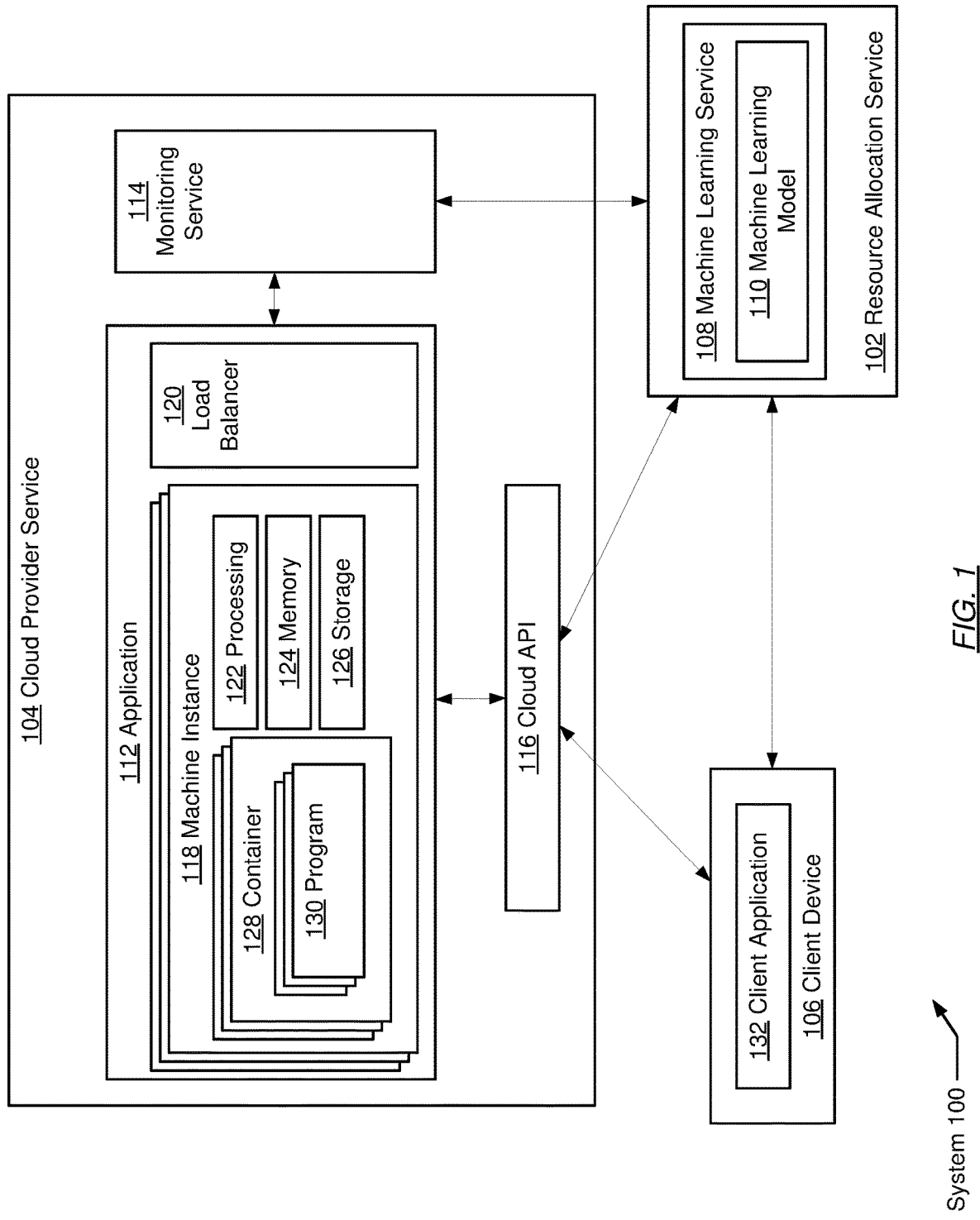
FIG. 1 shows a system in accordance with one or more embodiments of the present disclosure.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Embodiments of the invention optimize the cost of running an application in a cloud infrastructure to meet a budget goal. The system takes input on the budget goals, a service level agreement (SLA) that the application has to meet, incoming traffic throughput (measured in transactions per second (tps)) for the application, resource utilization metrics, thresholds, license costs associated with monitoring tools and third party frameworks, etc., and makes a determination on which resource to be scaled in a given scenario that meets the budget goals instead of creating a new container.

Embodiments of the invention acquire data on different metrics on the health of containers from a monitoring service, traffic patterns on the application from a load balancer, the cost of using resources from the application programmer interface (API) of the cloud provider service, user input data that includes the service level agreement to be met by application, licensing costs involved for the tools used in containers (e.g., dynatrace monitoring, splunk log monitoring, etc.), license costs of 3rd party frameworks (e.g., cache frameworks like couch base, coherence, etc.), and the budget goals. The system keeps learning about the application environment by acquiring these data points at regular intervals of time. The system waits for a condition (or an alert) to be triggered to start the process to make a decision on the best outcome that will be cost optimal to meet budget goals as well as meet the service level agreement for the application.

In general, to be cost optimized, the application is deployed to a cloud provider service. A load balancer is often used to route the traffic among different containers used by the application. The application containers and load balancer have monitoring enabled. The monitoring agents that run on these send data to a centralized monitoring service that contains database, user interface, and alert services. The monitoring service is also able to configure thresholds based on user input to the system to make sure the application meets a specified service level agreement. If the monitoring system detects that any container or multiple containers of the application is crossing a threshold, the monitoring system sends an alert to the system to determine the next action to be taken that is cost optimal. The system then determines using past data from the metrics and machine learning techniques to determine the best solution that meets service level agreement and budget goals. The system then calls the corresponding cloud provider service APIs or container APIs to add/reduce the additional resources. If the system needs to add an additional container, then the system calls the corresponding API to create a new container and it will also send a notification to the user on this action. The system will then keep polling the data at regular intervals and continues to learn about the application environment.

FIG. 1 shows a diagram of a system (100) in accordance with one or more embodiments of the invention. The various components of the system (100) may correspond to the computing system shown in FIGS. 8A and 8B. In particular, the type, hardware, and computer readable medium for the various components of the system (100) is presented in reference to FIGS. 8A and 8B. FIG. 1 shows a component diagram of the system (100). The system (100) includes the resource allocation service (102), the cloud provider service (104), and the client device 106. In one or more embodiments, one or more of the components shown in FIG. 1 may be omitted, repeated, combined, and/or altered as shown from FIG. 1. Accordingly, the scope of the present disclosure should not be considered limited to the specific arrangement of components shown in FIG. 1.

The resource allocation service (102) is a collection of programs operating on a collection of server machines. In one or more embodiments, the resource allocation service (102) receives budget information from the client device (106), pricing information from the cloud provider service (104), and performance information from the cloud provider service (104) and updates the resource allocation for the application (112) operating on the cloud provider service (104) based on the received information. The resource allocation service (102) includes the machine learning service (108).

The machine learning service (108) is a collection of programs operating on a collection of server machines. In one or more embodiments, the machine learning service (108) stores information received from the client device (106) and from the cloud provider service (104) as historical information. The machine learning service (108) includes the machine learning model (110). The machine learning service (108) operates the machine learning model (110) to generate predictions that are used to generate reallocation instructions.

The machine learning model (110) is a collection of programs operating on a collection of server machines. In one or more embodiments, the machine learning model (110) is trained with historical information and generates predictions based on that training. In one or more embodiments, the machine learning model (110) is a neural network model, as described in FIG. 2. In one or more embodiments, a single machine learning model is used for each container (128) of the application (112), such as when each container shares a similar configuration. Additional and alternative embodiments can have different machine learning models (110) for each of the individual containers (128) of the application (112). Additional and alternative embodiments can have a single machine learning model (110) that is applied to the application (112) instead of or in addition to the individual containers (128).

The cloud provider service (104) is a collection of programs operating on a collection of server machines. In one or more embodiments, the cloud provider service (104) hosts the application (112), hosts the monitoring service (114), and exposes the cloud application programming interface (API) (116).

The application (112) is a container-based application that includes a collection of programs operating on a collection of server machines hosted within the cloud provider service (104). In one or more embodiments, the application (112) is deployed with a set of containers (128) to a set of machine instances (118) that are balanced with the load balancer (120). In one or more embodiments, the application (112) is a client-server computer program in which the client, e.g., the client application (132), runs in a web browser and provides functions for webmail, online retail sales, online auctions, wikis, instant messaging services, etc. In one or more embodiments, the application (112) is a database.

The machine instances (118) are virtual machine instances provided by the cloud provider service (104) that host the containers (128) of the application (112). In one or more embodiments, each machine instance (118) includes a fixed amount of processing (122), memory (124), and storage (126) from a physical machine that hosts the machine instance (118). Each machine instance (118) hosts a set of containers (128) that execute the functions of the application (112). In one or more embodiments, each machine instance (118) corresponds to one type of machine instance provided by the cloud provider service (104) and enumerated in a list of machine instance types. Each machine instance type in the list of machine instance types identifies a type of virtual machine instance.

Processing (122) is the processing power of the machine instance (118). Processing (122) can be measured and limited by one or more of the number of cores, the number of virtual cores, the number of threads, the number of processing cycles, etc., that are available to the physical machine hosting the machine instance (118) on a real or percentage basis.

Memory (124) is the amount of memory available to the machine instance (118). In one or more embodiments, the memory (124) is a dynamic random-access memory (DRAM) to which access by the machine instance is limited on a real or percentage basis.

Storage (126) is the amount of storage available to the machine instance (118). In one or more embodiments, the storage (126) is a solid-state storage device (SSD) to which access by the machine instance is limited on a real or percentage basis.

The container (128) is one of a set of containers on the machine instance (118) that includes the program (130). The configuration of each container (128) is controlled by a set of parameters. The parameters include several types of parameters and are used to control and limit the resources used by the container. Parameters of a first type control access to hardware resources and limit, for example, how much of the processing (122), the memory (124), and the storage (126) of the machine instance (118) can be consumed by the container (128). Parameters of a second type can include, for example, limits to resources provided by the operating system, the number of sockets used by program (130), the heap size, etc. In one or more embodiments, the container (128) is a Docker container managed by Kubernetes operating in a Linux environment.

The program (130) is one of a set of programs within the container (128) executing on the machine instance (118) as a part of the application (112). The program (130) can be a web server, a database server, an application server, an application, an application that performs the logic utilized by other applications, a monitoring agent, etc. In one or more embodiments, the monitoring agent monitors the performance of the container (128) by reporting the resources that are both available to and consumed by the container (128).

The load balancer (120) improves the distribution of workloads across the machine instances (118) and the containers (128). In one or more embodiments, the load balancer (120) optimizes resource use, maximizes throughput, minimizes response time, and avoids overload of any single resource used by the application (112). The load balancer (120) provides performance information to the monitoring service (114) that includes latency measurements, throughput measurements, and traffic measurements for each machine instance (118) and for each container (128).

The monitoring service (114) is a collection of programs operating on a collection of server machines in the cloud provider service (104). In one or more embodiments, the monitoring service (114) records and analyzes the performance information provided by the application (112), e.g., from the load balancer (120) and from performance measurement agents within the containers (128). The performance information is recorded into a database and can be reported and forwarded to the resource allocation service. In one or more embodiments, the monitoring service (114) generates alerts based on an analysis of the performance information.

The cloud API (116) is exposed by the cloud provider service (104) to provide access to the components and services within the cloud provider service (104). In one or more embodiments, the cloud API (116) is a set of subroutine definitions, communication protocols, and tools that are used to access and control the services, applications, and machine instances hosted within the cloud provider service (104).

The client device (106) is a collection of programs operating on at least one client machine. In one or more embodiments, the client device (106) is a computer (e.g., smartphone, tablet computer, desktop computer, etc.) and the client application (132) is a web browser. In one or more embodiments, the client device (106) is a server computer and the client application (132) is a stack of programs and components. In one or more embodiments, the client device (106) is used by a developer to operate, maintain, and interact with the application (112) and the resource allocation service (102).

In one or more embodiments, the client application (132) provides budget information to the resource allocation service (102). In one or more embodiments, the client application (132) presents notifications from the cloud provider service regarding the performance of the application (112) and presents notifications from the resource allocation service (102) about the allocation of resources of the application (112).

Figure 2:
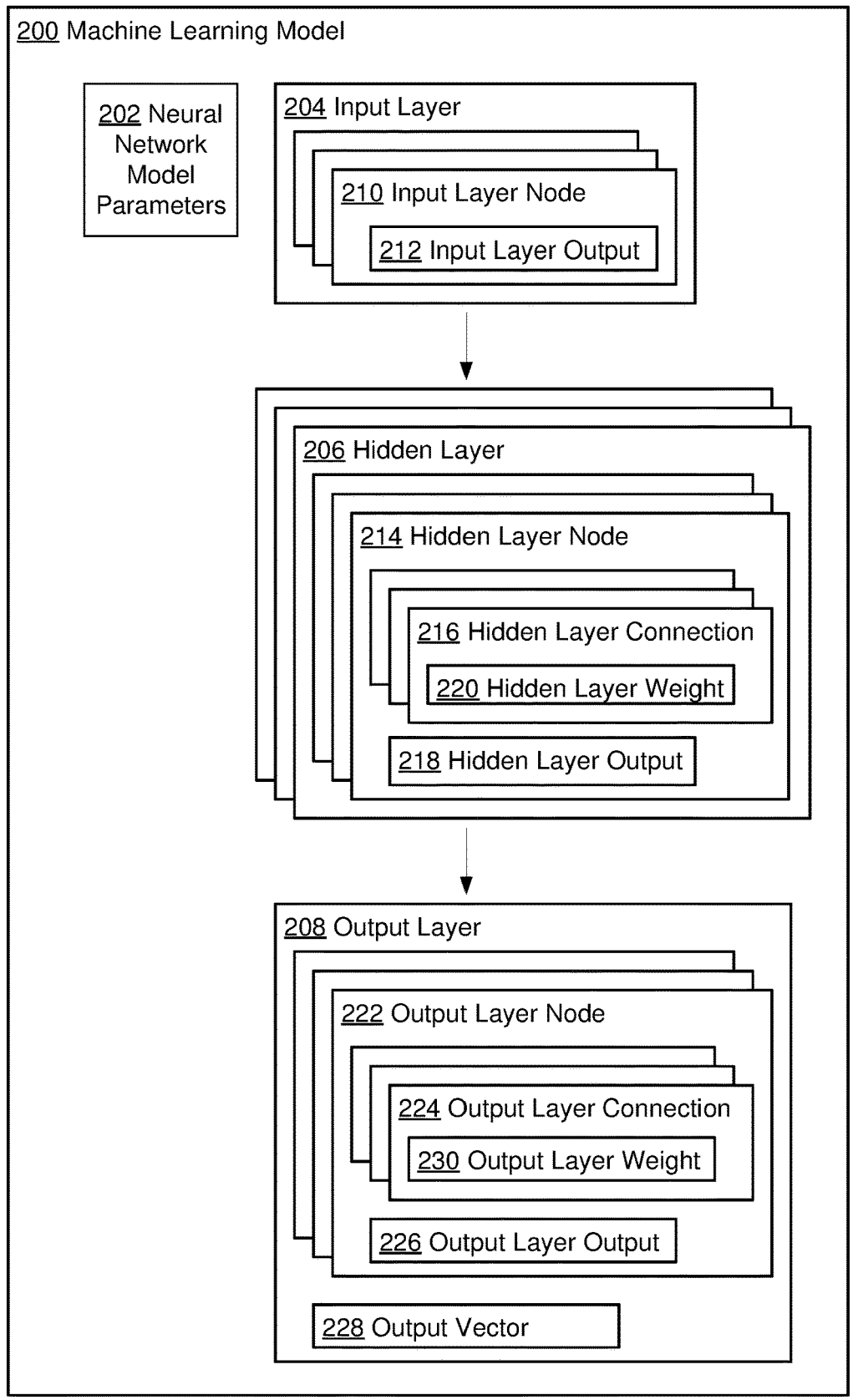
FIG. 2 shows a diagram of a machine learning model in accordance with one or more embodiments of the present disclosure.

FIG. 2 shows the machine learning model (200) in accordance with one or more embodiments. Referring to FIG. 2, the machine learning model (200) is formed as a neural network that includes the neural network model parameters (202), the input layer (204), the one or more hidden layers (206), and the output layer (208). A machine learning service generates the neural network model input features that are input to the input layer (204), processed by the hidden layers (206), and then processed by the output layer (208) to generate the output vector (228).

The neural network parameters (202) specify and define the machine learning model (200) and its behavior. In one or more embodiments, the parameters (202) include a definition of the machine learning model (200) that identifies the number of nodes, layers, and connections in the neural network formed by the machine learning model (200) as well as the activation functions, hyperparameters, batch size, bias, etc. In one or more embodiments, the activation function used by the nodes of the neural network is a rectified linear unit (ReLU) activation function.

The input layer (204) includes one or more nodes (210). In one or more embodiments, each input layer node (210) includes an output (212). In one or more embodiments, the input layer (204) includes five nodes (210), one for each of the five neural network model features identified in Table 1 below.

TABLE 1

| | |
|---|---|
| processing % | current processor usage divided by available processing power |
| memory % | current memory usage divided by available memory |
| storage % | current storage usage divided by available storage |
| latency % | current latency divided by predefined latency |
| traffic % | current traffic load divided by baseline traffic load |

In one or more embodiments, the processor usage is based on one or more of the number of cores, the number of virtual cores, the number of threads, the number of processing cycles, number of input/output operations per second (IOPS), a sum (adding one or more of the previous values), a weighted sum, etc. In one or more embodiments, the memory usage and storage usage can be measured in a denomination of bytes, including megabytes and gigabytes. In one or more embodiments, the latency is the amount of time taken for a response to be sent in response to a request received by the application and is denominated in units of time, such as seconds, milliseconds, or microseconds, etc., and the predefined latency is a targeted latency time for how long responses should take. In one or more embodiments, the traffic load is the number of requests handled by a particular container and the baseline traffic load is one of an average traffic load for all containers or a targeted number of handled requests for a container.

Each of the one or more hidden layers (206) includes one or more nodes (214). In one or more embodiments, each hidden layer node (214) includes one or more connections (216) and an output (218). Each hidden layer connection (216) of a hidden layer node (214) identifies another node within the neural network model that is used as an input to the node comprising the connection (216). Each hidden layer connection (216) includes a weight (220). The output (218) is calculated by performing a multiply accumulate operation. In the multiply accumulate operation, for each node connected to a given node, the outputs of the connected nodes are multiplied by a respective weight and each of these multiplicative results is summed to form a summed value. The summed value is activated by applying the activation function to the summed value to form the output (218). In one or more embodiments, the machine learning model (200) includes two hidden layers (206). The first hidden layer includes at least five nodes (214) that are fully connected to the five input layer nodes. In being fully connected, each of the nodes in the first hidden layer has a connection to each of the five nodes in the input layer. The second hidden layer (206) includes at least five nodes (214) that are fully connected to the nodes of the first hidden layer (206).

The output layer (208) includes one or more nodes (222) and an output vector (228). Each output layer node (222) includes one or more connections (224) and an output (226). The output layer connections each include a weight (230). The nodes (222), connections (224), weights (230), and output (226) operate in a similar fashion to those described in the hidden layers (206). The output vector (228) includes an element for the output (226) of each output layer node (222) and can be extended with additional elements. In one or more embodiments, the output layer (208) includes four nodes (222), one for each of the four neural network model features identified in Table 2 below. In one or more embodiments, each output (226) is one of a real number, is a binary value, or a Boolean value.

TABLE 2

| first output | adjust one parameter of first type |
| second output | adjust plurality of parameters of first type |
| third output | adjust parameter of second type |
| fourth output | update machine instance type |

In one or more embodiments, the first output indicates whether a single parameter of a first type of parameters should be adjusted. As discussed above, the first type of parameters can include hardware-based parameter limits, including a processor limit, a memory limit, a storage limit, etc., which are used by the containers of the application. When the first output is a real number above a threshold (e.g., 0.5), is a binary value set to 1, or a Boolean value set to true, then one of the parameters should be adjusted. In one or more embodiments, the parameter to be adjusted was identified in an alert generated by a monitoring service that identified the parameter to adjust based on performance information received from monitoring agents within the containers of the application.

In one or more embodiments, the second output indicates that multiple parameters of the first type should be adjusted. In one or more embodiments, each of the parameters to be adjusted is identified in an alert from the monitoring service.

In one or more embodiments, the third output indicates that at least one parameter of a second type should be adjusted. As discussed above, the second type of parameters include operating system resource limits, sockets limits, and heap size limits.

In one or more embodiments, the fourth output indicates the containers of the application redeployed to a different type of machine instance. In one or more embodiments, the different machine instance is an updated machine instance that includes a different amount of processing power, memory, and storage as compared to the current machine instances on which the containers of the application are running.

In one or more embodiments, instead of or in addition to the activation function being used, a softmax function is applied to identify the output with the highest value. The output with the highest value is then assigned one and the remaining outputs are assigned zero to form the output vector (228) as a one-hot vector.

Figure 3:
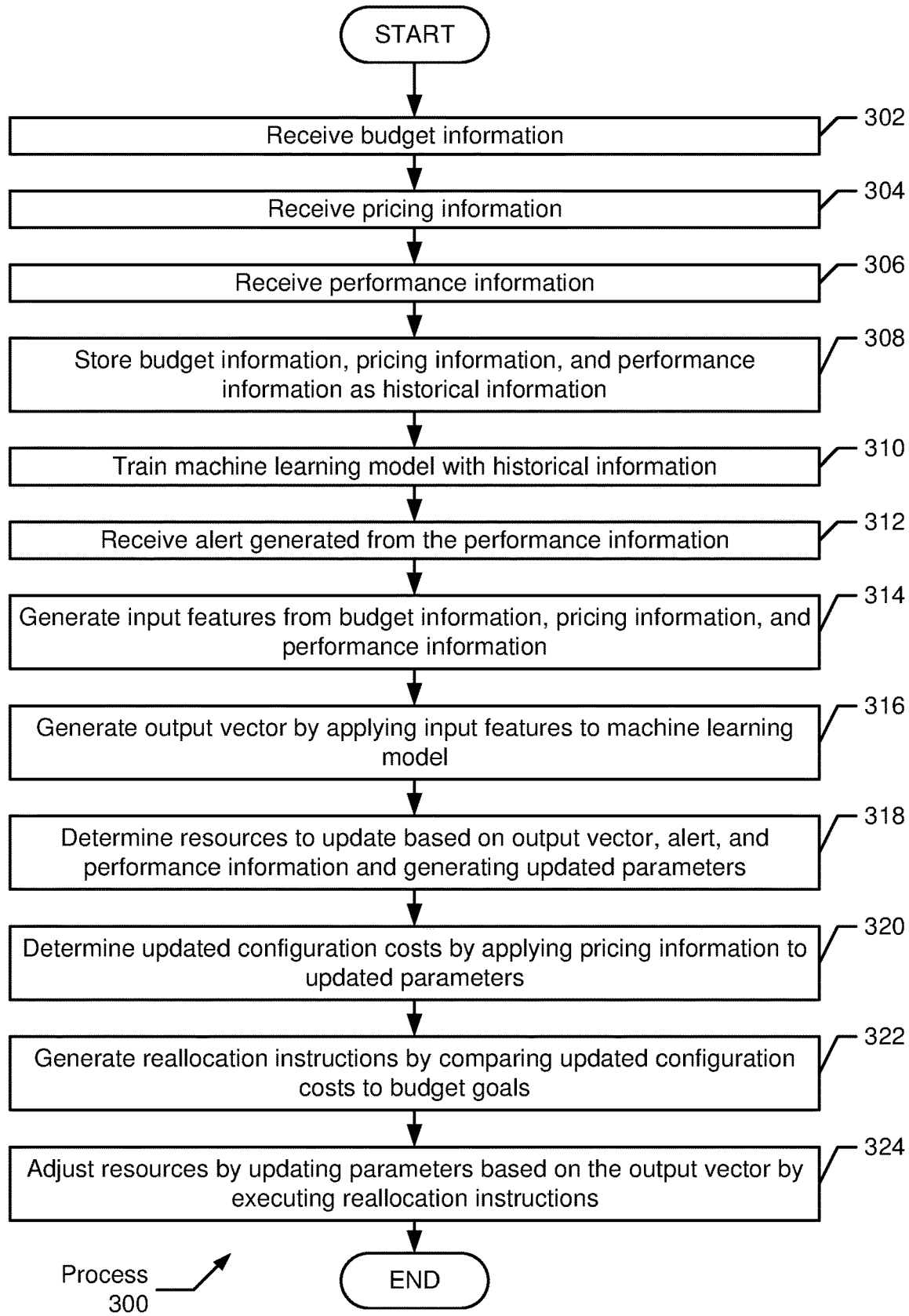
FIG. 3 shows a method for resource allocation in a cloud infrastructure in accordance with one or more embodiments of the present disclosure.

FIG. 3 shows a flowchart in accordance with one or more embodiments of the present disclosure. The flowchart of FIG. 3 depicts a process (300) for cost optimized dynamic resource allocation in a cloud infrastructure. The process (300) can be implemented on one or more components of the system (100) of FIG. 1. In one or more embodiments, one or more of the steps shown in FIG. 3 may be omitted, repeated, combined, and/or performed in a different order than the order shown in FIG. 3. Accordingly, the scope of the present disclosure should not be considered limited to the specific arrangement of steps shown in FIG. 3.

In Step 302, budget information is received. In one or more embodiments, the budget information is transmitted from a client device using a client application, such as a web browser, and is received by a resource allocation service. The budget information identifies budget goals for the application and can include a service level agreement (SLA). In one or more embodiments, the budget goals identify cost limits for running the application and can define a total cost, total cost per unit of time (per year, per hour, etc.), total cost per machine instance, and total cost per machine instance per unit of time.

In Step 304, pricing information is received. In one or more embodiments, the pricing information is transmitted from the cloud provider service and is received by the resource allocation service in response to a request from the resource allocation service for the pricing information. The pricing information identifies the costs for running the machine instances on which the containers of the application are deployed and can include licensing costs for the programs and frameworks used by the application and its containers. In one or more embodiments, the costs are quantified as the cost per machine instance per unit of time in a list of machine instance types. Each type of machine instance can have its own cost associated with it. The machine instances that have more available resources (processing power, memory, storage) generally have a higher cost than the machine instances with fewer available resources. In one or more embodiments, the pricing information includes a price for each machine instance type of the list of machine instance types as well as license costs for the agents and frameworks used by the application.

In Step 306, performance information is received. In one or more embodiments, the performance information is received by the resource allocation service from the monitoring service, which received the performance information from the load balancer of the application and from the monitoring agents within the containers of the application. In one or more embodiments, the monitoring service stores the performance information in a database accessible to the monitoring service and then transmits the performance information to the resource allocation service. Transmission of the performance information from the monitoring service can be pushed to the resource allocation service as soon as updates are made or pushed periodically. Transmission of the performance information can also be pulled from the monitoring service in response to requests from the resource allocation service. In one or more embodiments, the performance information includes a processor value, a memory value, a storage value, a latency value, and a traffic value for each container of the set of containers that execute the application.

In Step 308, the budget information, pricing information, and performance information is stored as historical information. In one or more embodiments, the resource allocation service stores the budget information, pricing information, and performance information to a database that is accessible by the machine learning service.

In Step 310, the machine learning model is trained with the historical information. In one or more embodiments, the machine learning service trains the machine learning model using the historical information that was received and stored by the machine learning service. Training the machine learning model is further described below with reference to FIG. 4.

In Step 312, an alert generated from the performance information is received. In one or more embodiments, the alert is generated by the monitoring service in response to performance information that is received from the load balancer or monitoring agents of the containers of the application. The performance information is compared to maximum and minimum thresholds that can be real numbers or percentages. For example, alerts can be generated when the processor usage is greater than 70% or less than 35%, memory usage is greater than 90% or less than 40%, and storage usage is greater than 95% less than 45%. Additional thresholds and alerts can be defined for the latency and the traffic measurements provided in the performance information. In one or more embodiments, the alerts are generated in response to an analysis of multiple resources, including the processor usage, memory usage, and storage usage. In one or more embodiments, each alert identifies one or more resources to be updated, examples of which are in FIG. 5 and FIG. 6. In additional or alternative embodiments, the alert is generated by the resource allocation service in response to receiving the performance information from the monitoring service.

In Step 314, input features are generated from the budget information, pricing information, and performance formation. In one or more embodiments, the machine learning service generates the input features from the most current values for the budget information, pricing information, and performance information received from the client device, the cloud provider service, and the monitoring service. As an example, the machine learning service generates values for the features listed in Table 1 above from the performance information received from the monitoring service and the monitoring agents of the containers of the application.

In Step 316, an output vector is generated by applying the input features to the machine learning model. In one or more embodiments, the machine learning service provides the input features to the machine learning model, which generates the output vector from the input features.

In Step 318, the resources to be updated are determined and updated parameters are generated. In one or more embodiments, the resources are determined based on the output vector, the alert, and the performance information. The alert identifies specific resources to be updated, which is identified by the resource allocation service.

The identified resources are compared to the output vector. When the identified resources from an alert match the output vector, then the identified resources from the alert are selected to be updated. As an example, the alert can identify that only processing power needs to be increased and the output vector can indicate that only a single hardware-based resource needs to be adjusted (e.g., the output vector is [1,0,0,0]) so that there is a match between the identified resources from the alert and the output vector.

When the identified resources from the alert do not match the output vector, then different resources (more or fewer) may be selected to be updated. As an example, the alert can identify that only processing power needs to be increased, but the output vector indicates that two hardware-based resource need to be adjusted (e.g., the output vector is [0,1,0,0]). In this case, the resource allocation service can identify a second hardware-based resource (e.g., memory, storage, etc.) based on an analysis of the performance information. When one or more additional resources are above the minimum threshold, then the resource with the highest usage is selected to be adjusted. When each of the additional resources are below the minimum threshold, then the resource with the lowest usage is selected to be adjusted.

After identifying the resources to be adjusted, the parameters that control those resources are identified and updated parameters are generated. In one or more embodiments, each resource can be updated by a unique amount that is determined from one or more tables, maps, and formulas. The unique amounts are added to the identified parameters to generate the updated parameters.

In Step 320, updated configuration costs are determined. In one or more embodiments, the resource allocation service determines the updated configuration costs by applying the pricing information to the updated parameters. The updated parameters can change the configuration of the resources for the machine instances as well as the number of machine instances that are used to execute the application. The resource allocation service generates a configuration model that takes into account the updated parameters and is enumerated in units used by the pricing information. The pricing information is then applied to the configuration model to determine the updated configuration cost for running the application using the updated configuration. For example, the pricing information can be denominated in dollars per machine instance per hour and the updated configuration can change the hardware resources and update the machine instance type to have the application run on a different number of machine instances of a different type. The new number of machine instances is multiplied by the cost per machine instance per hour to determine the cost per hour for running the application.

In Step 322, reallocation instructions are generated. In one or more embodiments, the resource allocation service generates the reallocation instructions by comparing the updated configuration costs to the budget goals. The budget information includes a budget goal that is compared to the updated configuration cost determined by the resource allocation service. As an example, the budget goal identifies a total cost for the next three months of operating the application using the cloud provider service. The number of hours in three months is multiplied by the updated configuration cost, which is priced in dollars per hour, to determine the projected cost for the next three months of operating the application. When the projected cost is less than the amount identified in the budget goal, then the resource allocation service generates instructions that will apply the updated parameters to the cloud provider service using the cloud API to adjust the resources and machine instances used by the containers that execute the application.

In one or more embodiments, when the projected cost does not meet the budget goal, then the resource allocation service still generates the reallocation instructions and generates a notification that is transmitted to the client device. The notification includes the projected cost for the updated configuration and the alert that triggered the analysis. In one or more embodiments, a developer can subsequently change the configuration of the containers of the application in response to the notification. The resource allocation service detects this change initiated by the developer by monitoring the configuration of the application, generates an output vector that corresponds to the detected change, and passes the generated output vector along with the notification to the machine learning service. The machine learning service stores into the historical information the performance information from the alert that was part of the notification along with the output vector that was generated by the machine learning service. The machine learning service subsequently uses the output vector generated in response to changes (that were in response to the notification) to train the machine learning model.

In Step 324, the resources used by the application are adjusted. In one or more embodiments, the resource allocation service adjusts the resources by updating the parameters used by the application based on the output vector by executing the reallocation instructions. In one or more embodiments, the reallocation instructions include cloud API calls that when executed cause the updated parameters to be applied to the containers and the machine instances of the cloud provider service. In one or more embodiments, the reallocation instructions adjust hardware-based resources (such as processing power, memory, storage, etc.) and operating system level resources (such as number of sockets, heap size, etc.) by increasing or decreasing the amount of resources available to the containers and machine instances of the application. The reallocation instructions can also adjust the number of machine instances used by the application. The reallocation instructions can include instructions for one or more of adding a container to the set of containers, removing a container from the set of containers, adding processing to a container of the set of containers, reducing processing to the container, adding memory to the container, reducing memory to the container, adding storage to the container, and reducing storage to the container.

Figure 4:
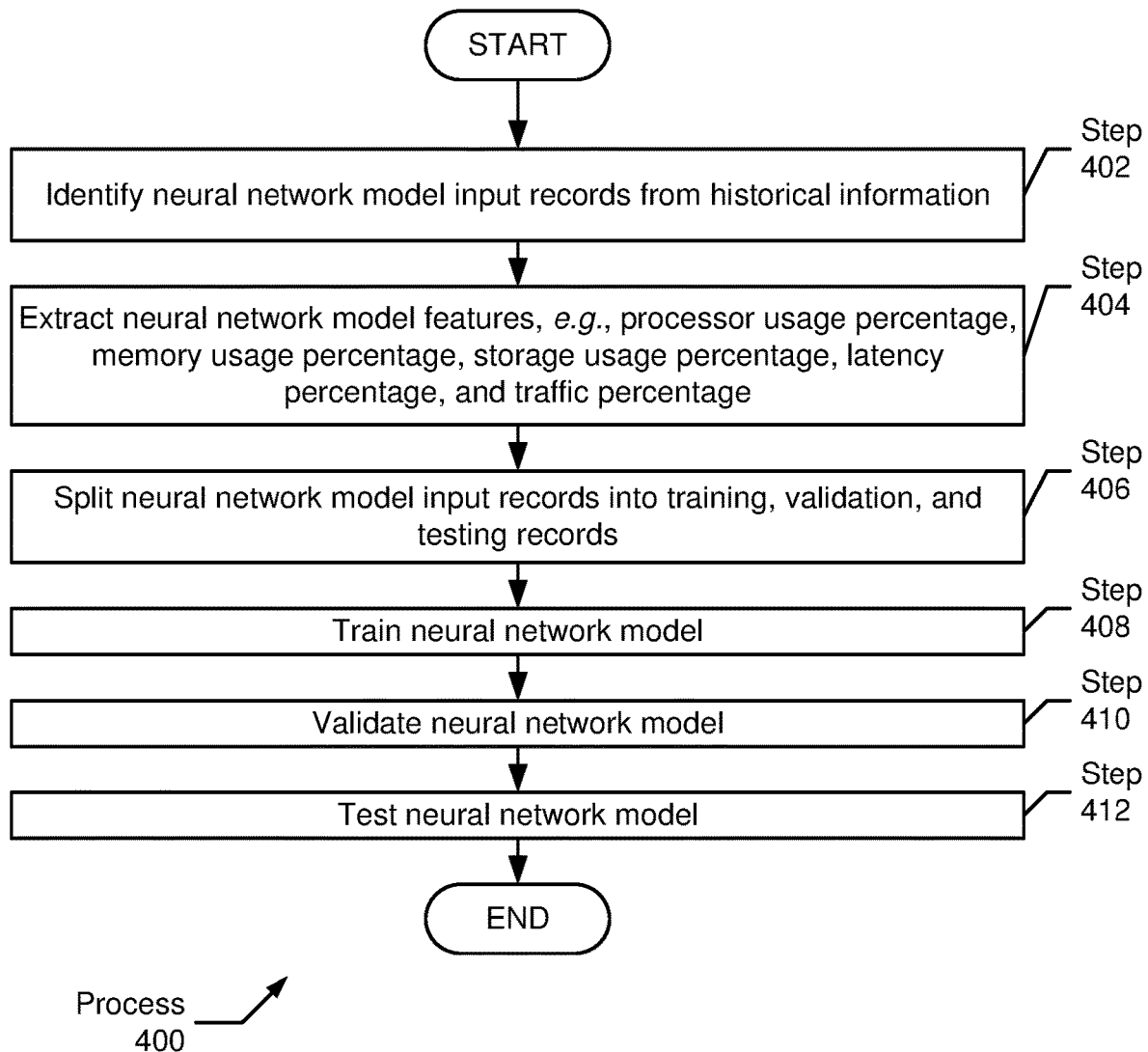
FIG. 4 shows a method for initializing a neural network model in accordance with one or more embodiments of the present disclosure.

FIG. 4 shows a flowchart in accordance with one or more embodiments of the present disclosure. The flowchart of FIG. 4 depicts a process (400) for initializing a neural network model, such as the model (200) described in FIG. 2. The process (400) can be implemented on one or more components of the system (100) of FIG. 1. In one or more embodiments, one or more of the steps shown in FIG. 4 may be omitted, repeated, combined, and/or performed in a different order than the order shown in FIG. 4. Accordingly, the scope of the present disclosure should not be considered limited to the specific arrangement of steps shown in FIG. 4.

In Step 402, neural network model input records are identified from historical information. In one or more embodiments, all of the records from the historical information are identified except for records that are dated less than 30 days old.

In Step 404, neural network model features are extracted from the input records. In one or more embodiments, the extracted features include values for processing percentage, memory percentage, storage percentage, latency percentage, and traffic percentage, which are described above in relation to Table 1.

In Step 406, the input records are split into training records, validation records, and testing records. In one or more embodiments, the training records include 70% of the input records selected at random, the validation records include 20% of the input records selected at random, and the testing records include 10% of the input records selected at random.

In Step 408, the neural network model is trained with the training records by: generating training predictions with the training records, calculating training prediction errors from the training predictions, updating the neural network model by backpropagating the training prediction errors and updating the weights of the neural network model based on backpropagated training prediction errors, and generating a training accuracy from the training record predictions and the training records.

In one or more embodiments, a training prediction is generated by feeding the neural network features extracted from an input record into the input layer of the neural network. The output from the input layer is propagated forward through the hidden layers to the output layer to form the output vector as the training prediction.

In one or more embodiments, a training prediction error is calculated as the difference between the training prediction and a known correct value from the input record. For example, when the input record indicates that the processor percentage is greater than 70%, the memory percentage is greater than 90%, and the storage percentage is less than or equal to 95%, then the output vector should be [0,1,0,0] to indicate that two hardware-based resources should be adjusted.

In one or more embodiments, backpropagating the training prediction error is performed by splitting the training prediction error for a given node among the set of connected nodes that are connected to the given node. In one or more embodiments, the training prediction error is split proportionally based on the weight of a connection. In one or more embodiments the weights are updated to reduce the amount of error between the training prediction and the known correct value.

The training accuracy is a ratio of correct predictions divided by the total number of predictions. In one or more embodiments, the training accuracy for the neural network model is determined by generating a prediction for each input record. In one or more embodiments, the training prediction used for the training accuracy is generated without adjusting the weights of the neural network.

In Step 410, the neural network model is validated with the validation records by: generating validation predictions with the validation records, generating a validation accuracy from validation predictions and validation records, comparing the validation accuracy to the training accuracy, and repeating the training step based on the comparison of the validation accuracy to the training accuracy. The validation predictions and the validation accuracy are generated and calculated similar to how the training predictions and training accuracy are calculated with the exception that the validation records are used instead of the training records.

In one or more embodiments, comparison of the validation accuracy to the training accuracy occurs after a number of training steps have been performed and identifies whether the validation accuracy is improving by an amount that is similar to improvement of the training accuracy. If the validation accuracy stops improving while the training accuracy continues to improve, then the neural network model may have been overfitted to the input records. In one or more embodiments, if the training accuracy improves and the validation accuracy improves by at least a threshold percentage, e.g., (validation accuracy/training accuracy)≥90%, then the training step will be repeated.

In Step 412, the neural network model is tested with the testing records by generating testing record predictions with the testing records and generating a testing accuracy from the testing record predictions and testing records. The testing predictions and the testing accuracy are generated and calculated similar to how the training predictions and training accuracy are calculated with the exception that the testing records are used instead of the training records. The testing accuracy is generated to provide an unbiased measure of the accuracy of the neural network model.

Figure 5:
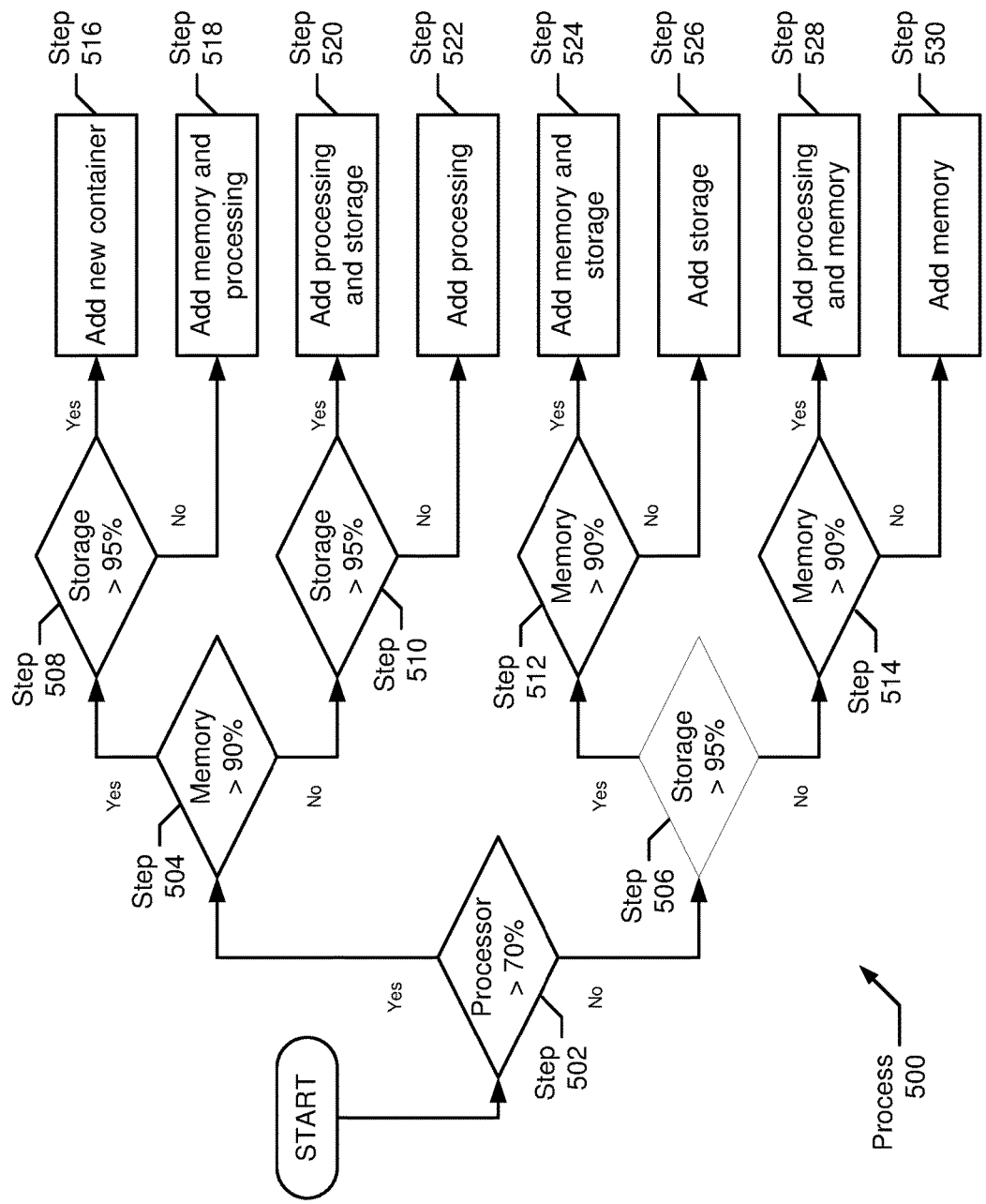
FIG. 5 and FIG. 6 show methods for generating alerts in accordance with one or more embodiments of the present disclosure.
Figure 6:
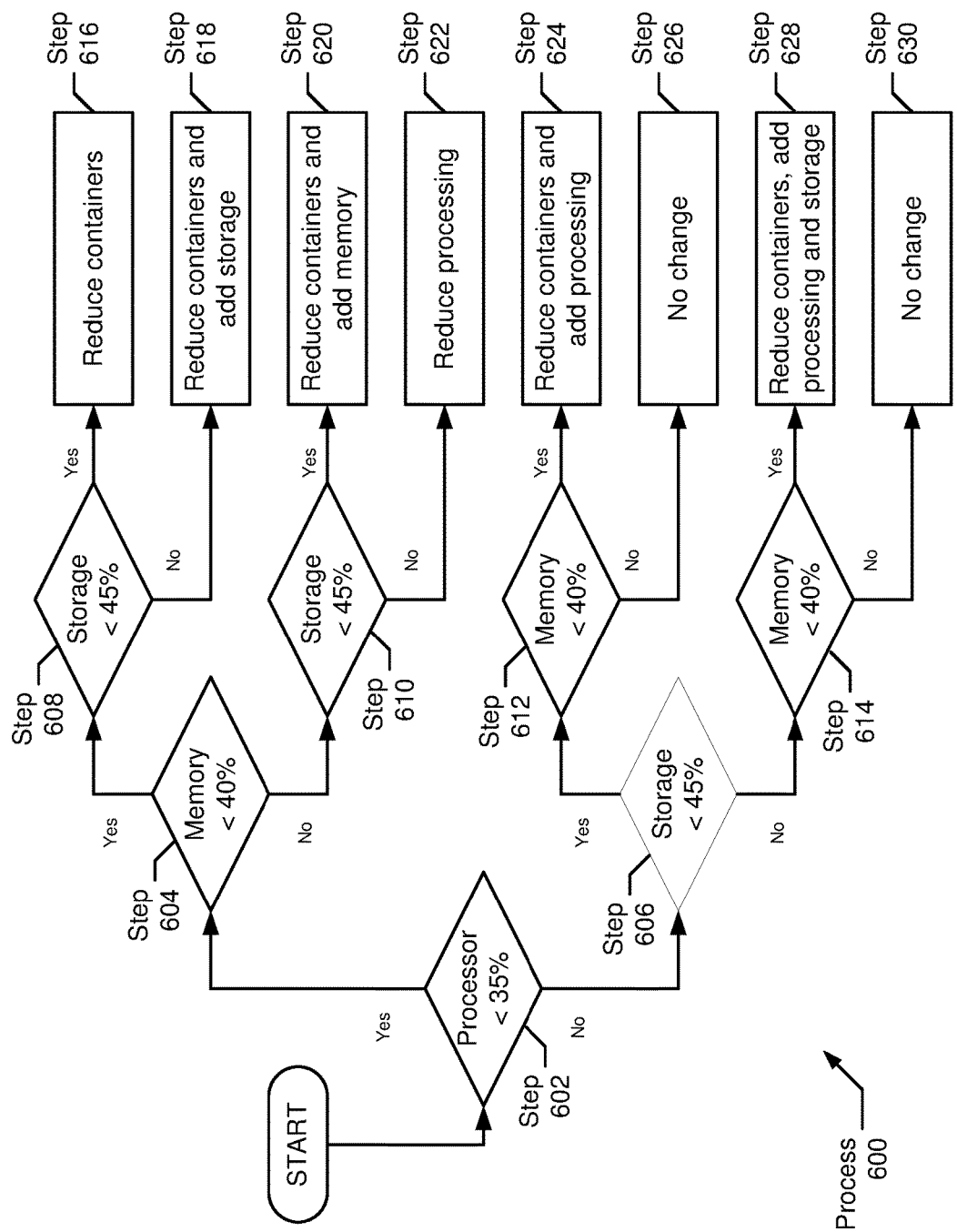

Turning to FIG. 5 and FIG. 6, in one or more embodiments, alerts are generated for individual metrics, including processor usage, memory usage, and storage usage. When the individual metric crosses a threshold, the alert can be generated and transmitted from the monitoring service. Additional embodiments can link the thresholds of a plurality of metrics to an action for updating the configuration of the application. The thresholds for the metrics, the groups of metrics, and the linked actions can be selected by a developer. When the thresholds, groups, and actions are selected by a developer, the accuracy for the action and the number of cases covered may be limited. FIG. 5 and FIG. 6 show thresholds, groups, and actions that can be linked by a developer.

FIG. 5 shows a flowchart in accordance with one or more embodiments of the present disclosure. The flowchart of FIG. 5 depicts a process (500) for generating alerts. The process (500) can be implemented on one or more components of the system (100) of FIG. 1, (e.g., the monitoring service (114) and/or the resource allocation service (102)). In one or more embodiments, one or more of the steps shown in FIG. 5 may be omitted, repeated, combined, and/or performed in a different order than the order shown in FIG. 5. Accordingly, the scope of the present disclosure should not be considered limited to the specific arrangement of steps shown in FIG. 5.

In Step 502, the current processor usage is compared to a maximum processor usage threshold. In one or more embodiments, the maximum processor usage threshold is 70%. If the current processor usage is greater than the threshold, then the process (500) continues to Step 504. Otherwise, the process (500) continues to Step 506.

In Step 504, the current memory usage is compared to a maximum memory usage threshold. In one or more embodiments, the maximum memory usage threshold is 90%. If the current memory usage is greater than the threshold, then the process (500) continues to Step 508. Otherwise, the process (500) continues to Step 510.

In Step 506, the current storage usage is compared to a maximum storage usage threshold. In one or more embodiments, the maximum storage usage threshold is 95%. If the current storage usage is greater than the threshold, then the process (500) continues to Step 512. Otherwise, the process (500) continues to Step 514.

In Step 508, the current storage usage is compared to a maximum storage usage threshold. In one or more embodiments, the maximum storage usage threshold is 95%. If the current storage usage is greater than the threshold, then the process (500) continues to Step 516. Otherwise, the process (500) continues to Step 518.

In Step 510, the current storage usage is compared to a maximum storage usage threshold. In one or more embodiments, the maximum storage usage threshold is 95%. If the current storage usage is greater than the threshold, then the process (500) continues to Step 520. Otherwise, the process (500) continues to Step 522.

In Step 512, the current memory usage is compared to a maximum memory usage threshold. In one or more embodiments, the maximum memory usage threshold is 90%. If the current memory usage is greater than the threshold, then the process (500) continues to Step 524. Otherwise, the process (500) continues to Step 526.

In Step 514, the current memory usage is compared to a maximum memory usage threshold. In one or more embodiments, the maximum memory usage threshold is 90%. If the current memory usage is greater than the threshold, then the process (500) continues to Step 528. Otherwise, the process (500) continues to Step 530.

In Step 516, an alert is generated. The alert indicates that a new container should be added to alleviate the current resource issues in which the processor usage, memory usage, and storage usage are above their respective maximum usage thresholds.

In Step 518, an alert is generated. The alert indicates that memory and processing power should be added instead of adding a container to alleviate the current resource issues in which the processor usage and memory usage are above their respective maximum usage thresholds.

In Step 520, an alert is generated. The alert indicates that processing power and storage should be added instead of adding a container to alleviate the current resource issues in which the processor usage and storage usage are above their respective maximum usage thresholds.

In Step 522, an alert is generated. The alert indicates that processing power should be added instead of adding a container to alleviate the current resource issues in which the processor usage is above its maximum usage threshold.

In Step 524, an alert is generated. The alert indicates that memory and storage should be added instead of adding a container to alleviate the current resource issues in which the memory usage and storage usage are above their respective maximum usage thresholds.

In Step 526, an alert is generated. The alert indicates that storage should be added instead of adding a container to alleviate the current resource issues in which the storage usage is above its maximum usage threshold.

In Step 528, an alert is generated. The alert indicates that processing and memory should be added instead of adding a container to alleviate the current resource issues in which the memory usage is above its maximum usage threshold.

In Step 530, an alert is generated. The alert indicates that memory should be added instead of adding a container when none of the resources are above their maximum usage thresholds.

FIG. 6 shows a flowchart in accordance with one or more embodiments of the present disclosure. The flowchart of FIG. 6 depicts a process (600) for generating alerts. The process (600) can be implemented on one or more components of the system (100) of FIG. 1, (e.g., the monitoring service (114) and/or the resource allocation service (102)). In one or more embodiments, one or more of the steps shown in FIG. 6 may be omitted, repeated, combined, and/or performed in a different order than the order shown in FIG. 6. Accordingly, the scope of the present disclosure should not be considered limited to the specific arrangement of steps shown in FIG. 6.

In Step 602, the current processor usage is compared to a minimum processor usage threshold. In one or more embodiments, the minimum processor usage threshold is 35%. If the current processor usage is less than the threshold, then the process (600) continues to Step 604. Otherwise, the process (600) continues to Step 606.

In Step 604, the current memory usage is compared to a minimum memory usage threshold. In one or more embodiments, the minimum memory usage threshold is 40%. If the current memory usage is less than the threshold, then the process (600) continues to Step 608. Otherwise, the process (600) continues to Step 610.

In Step 606, the current storage usage is compared to a minimum storage usage threshold. In one or more embodiments, the minimum storage usage threshold is 45%. If the current storage usage is less than the threshold, then the process (600) continues to Step 612. Otherwise, the process (600) continues to Step 614.

In Step 608, the current storage usage is compared to a minimum storage usage threshold. In one or more embodiments, the minimum storage usage threshold is 45%. If the current storage usage is less than the threshold, then the process (600) continues to Step 616. Otherwise, the process (600) continues to Step 618.

In Step 610, the current storage usage is compared to a minimum storage usage threshold. In one or more embodiments, the minimum storage usage threshold is 45%. If the current storage usage is less than the threshold, then the process (600) continues to Step 620. Otherwise, the process (600) continues to Step 622.

In Step 612, the current memory usage is compared to a minimum memory usage threshold. In one or more embodiments, the minimum memory usage threshold is 40%. If the current memory usage is less than the threshold, then the process (600) continues to Step 624. Otherwise, the process (600) continues to Step 626.

In Step 614, the current memory usage is compared to a minimum memory usage threshold. In one or more embodiments, the minimum memory usage threshold is 40%. If the current memory usage is less than the threshold, then the process (600) continues to Step 628. Otherwise, the process (600) continues to Step 630.

In Step 616, an alert is generated. The alert indicates that the number of containers should be reduced to alleviate the current resource issues in which the processor usage, memory usage, and storage usage are below their respective minimum usage thresholds.

In Step 618, an alert is generated. The alert indicates that the number of containers should be reduced and storage should be added to alleviate the current resource issues in which the processor usage and memory usage are below their respective minimum usage thresholds.

In Step 620, an alert is generated. The alert indicates that the number of containers should be reduced and memory should be added to alleviate the current resource issues in which the processor usage and storage usage are below their respective minimum usage thresholds.

In Step 622, an alert is generated. The alert indicates that processing power should be reduced instead of removing a container to alleviate the current resource issues in which the processor usage is below its minimum usage threshold.

In Step 624, an alert is generated. The alert indicates that the number of containers should be reduced and processing power should be added to alleviate the current resource issues in which the memory usage and storage usage are below their respective minimum usage thresholds.

In Step 626, an alert is generated. The alert indicates that no change should be made since the only resource issue is that the storage usage is below its minimum usage threshold.

In Step 628, an alert is generated. The alert indicates that the number of containers should be reduced and processing power and storage should be added to alleviate the current resource issues in which the memory usage are below its minimum usage threshold.

In Step 630, an alert can be generated. The alert indicates that no change should be made since none of the resources are below their respective minimum usage threshold.

FIG. 7 shows an output in accordance with one or more embodiments of the present disclosure. The output is in a tabular form with rows and columns and can be presented using one or more components of the system (100) of FIG. 1. For example, the client application (132) of the client device (106) of FIG. 1 can show one or more of the depicted rows and columns to a user. In one or more embodiments, one or more of the rows and columns shown in FIG. 7 may be omitted, repeated, combined, and/or presented in a different order than the order shown in FIG. 7. Accordingly, the scope of the present disclosure should not be considered limited to the specific arrangement of rows and columns shown in FIG. 7.

The table (700) includes a set of rows (702-724) and a set of columns (726-742). The rows 702 and 704 are header rows. Each of rows 706-724 forms a record that includes a set of input features (columns 726-734) and an output vector (columns 736-742). The columns 726-734 include fields for processor percentage, memory percentage, storage percentage, latency percentage, and traffic percentage, which are similar to the features described above in Table 1. The columns 736-742 include fields for the outputs of a machine learning model (such as a neural network) that form the output vector.

In one or more embodiments, the table (700) is generated dynamically as the resource allocation service receives alerts that are based on the performance information received from the monitoring service. The values in the columns 726-734 are generated by the machine learning service in response to an alert and/or performance information being received. After generating the values in the columns 726-734 for a record, the values in the columns 726-734 are passed into the machine learning model to generate the output vector in the columns 736-742. The output vector in the columns 736-742 is used by the machine learning service and the resource allocation service to generate reallocation instructions to allocate resources used by the application in the cloud provider service, as described in Steps 318-324 of FIG. 3.

Figure 8A:
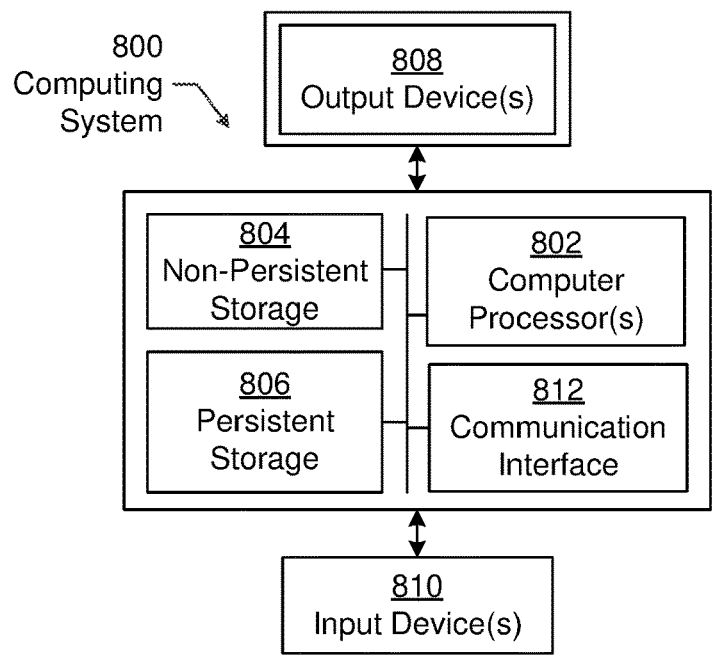
FIG. 8A and FIG. 8B show a computing system in accordance with one or more embodiments of the invention.

Embodiments of the invention may be implemented on a computing system. Any combination of mobile, desktop, server, router, switch, embedded device, or other types of hardware may be used. For example, as shown in FIG. 8A, the computing system (800) may include one or more computer processors (802), non-persistent storage (804) (e.g., volatile memory, such as random access memory (RAM), cache memory), persistent storage (806) (e.g., a hard disk, an optical drive such as a compact disk (CD) drive or digital versatile disk (DVD) drive, a flash memory, etc.), a communication interface (812) (e.g., Bluetooth interface, infrared interface, network interface, optical interface, etc.), and numerous other elements and functionalities.

The computer processor(s) (802) may be an integrated circuit for processing instructions. For example, the computer processor(s) may be one or more cores or micro-cores of a processor. The computing system (800) may also include one or more input devices (810), such as a touchscreen, keyboard, mouse, microphone, touchpad, electronic pen, or any other type of input device.

The communication interface (812) may include an integrated circuit for connecting the computing system (800) to a network (not shown) (e.g., a local area network (LAN), a wide area network (WAN) such as the Internet, mobile network, or any other type of network) and/or to another device, such as another computing device.

Further, the computing system (800) may include one or more output devices (808), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (802), non-persistent storage (804), and persistent storage (806). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 8B:
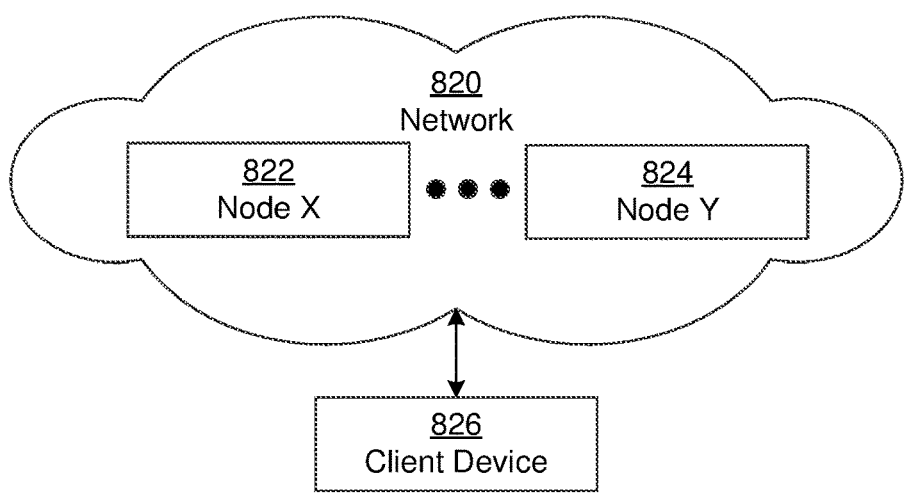

The computing system (800) in FIG. 8A may be connected to or be a part of a network. For example, as shown in FIG. 8B, the network (820) may include multiple nodes (e.g., node X (822), node Y (824)). Each node may correspond to a computing system, such as the computing system shown in FIG. 8A, or a group of nodes combined may correspond to the computing system shown in FIG. 8A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (800) may be located at a remote location and connected to the other elements over a network.

Although not shown in FIG. 8B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (822), node Y (824)) in the network (820) may be configured to provide services for a client device (826). For example, the nodes may be part of a cloud computing system. The nodes may include functionality to receive requests from the client device (826) and transmit responses to the client device (826). The client device (826) may be a computing system, such as the computing system shown in FIG. 8A. Further, the client device (826) may include and/or perform all or a portion of one or more embodiments of the invention.

The computing system or group of computing systems described in FIGS. 8A and 8B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 8A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections).

Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 8A, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 8A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 8A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 8A and the nodes and/ or client device in FIG. 8B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
   receiving budget information of a containerized application deployed with a set of containers to a set of machine instances;
   receiving pricing information of a list of machine instance types;
   receiving performance information of the set of containers;
   receiving an alert generated based on the performance information by comparing the performance information to a set of thresholds;
   generating, after receiving the alert, an output vector from a machine learning model, wherein the machine learning model uses the performance information;
   determining the resource to update based on the output vector and the alert by:
      comparing the output vector to the alert, and
      generating an updated parameter from comparing the output vector to the alert, wherein the updated parameter is one of a processor limit, a memory limit, a storage limit, a heap size, and a container number limit;
   determining an updated configuration cost by applying the pricing information to the updated parameter;
   generating reallocation instructions by comparing the updated configuration cost to a budget goal from the budget information; and
   adjusting a resource of the set of containers by updating a parameter based on the output vector in response to the alert,
      wherein the resource is controlled by the parameter, and
      wherein the parameter is identified in the alert.

2. The method of claim 1, further comprising:
   generating a set of input features from one or more of the budget information, the pricing information, and the performance information,
      wherein the input features include a processor usage percentage, a memory usage percentage, a storage usage percentage, a latency percentage, and a traffic percentage.

3. The method of claim 2, further comprising:
   generating the output vector by applying the set of input features to a neural network,
      wherein the neural network is the machine learning model,
      wherein the neural network includes an input layer with five input nodes, a set of hidden layers, and an output layer with four output nodes that form the output vector,
      wherein a first output node identifies that at least one parameter of a set of parameters of a first parameter type is to be adjusted,
      wherein a second output node identifies that a plurality of parameters of the set of parameters of the first parameter type are to be adjusted,
      wherein a third output node identifies that a second parameter of the set of parameters of a second parameter type is to be adjusted,
      wherein a fourth output node identifies that a machine instance type is to be upgraded,
      wherein the set of hidden layers includes a first hidden layer and a second hidden layer that each include at least five nodes, and
      wherein the input layer is fully connected to the first hidden layer, the first hidden layer is fully connected to the second hidden layer, and the second hidden layer is fully connected to the output layer.

4. The method of claim 1, further comprising:
   storing the budget information, pricing information, and performance information as historical information; and
   training the machine learning model with the historical information.

5. The method of claim 1, further comprising:
adjusting the resource by executing the reallocation instructions to apply the updated parameter to the set of containers by updating the parameter to the updated parameter,
wherein the reallocation instructions include one or more of adding a container to the set of containers, removing a container from the set of containers, adding processing to a container of the set of containers, reducing processing to the container, adding memory to the container, reducing memory to the container, and adding storage to the container.

6. The method of claim 1, further comprising:
receiving the budget information from a client device,
wherein the budget information includes a budget of the containerized application;
retrieving the pricing information by accessing an application program interface of a cloud service provider that hosts the containerized application,
wherein the pricing information includes a price for each machine instance type of the list of machine instance types,
wherein the machine instances of the set of machine instances each correspond with a same machine instance type of the list of machine instance types,
wherein each machine instance of the set of machine instances hosts a container of the set of containers,
wherein each machine instance type in the list of machine instance types identifies a type of virtual machine; and
receiving the performance information from a monitoring service hosted by the cloud service provider,
wherein the performance information includes a processor value, a memory value, a storage value, a latency value, and a traffic value for each container of the set of containers.

7. A system, comprising:
a memory coupled to a processor;
a resource allocation service that executes on the processor, uses the memory, and is configured for:
receiving budget information of a containerized application deployed with a set of containers to a set of machine instances;
receiving pricing information of a list of machine instance types;
receiving performance information of the set of containers;
receiving an alert generated based on the performance information by comparing the performance information to a set of thresholds;
a machine learning model that executes on the processor, uses the memory, and is configured for:
generating, after receiving the alert, an output vector from a machine learning model, wherein the machine learning model uses the performance information; and
the resource allocation service further configured for:
determining the resource to update based on the output vector and the alert by:
comparing the output vector to the alert, and
generating an updated parameter from comparing the output vector to the alert, wherein the updated parameter is one of a processor limit, a memory limit, a storage limit, a heap size, and a container number limit;
determining an updated configuration cost by applying the pricing information to the updated parameter;
generating reallocation instructions by comparing the updated configuration cost to a budget goal from the budget information; and
adjusting a resource of the set of containers by updating a parameter based on the output vector in response to the alert,
wherein the resource is controlled by the parameter, and
wherein the parameter is identified in the alert.

8. The system of claim 7, further comprising:
a machine learning service that executes on the processor, uses the memory, and is configured for:
generating a set of input features from one or more of the budget information, the pricing information, and the performance information,
wherein the input features include a processor usage percentage, a memory usage percentage, a storage usage percentage, a latency percentage, and a traffic percentage.

9. The system of claim 8, wherein the machine learning model is further configured for:
generating the output vector by applying the set of input features to a neural network,
wherein the neural network is the machine learning model,
wherein the neural network includes an input layer with five input nodes, a set of hidden layers, and an output layer with four output nodes that form the output vector,
wherein a first output node identifies that at least one parameter of a set of parameters of a first parameter type is to be adjusted,
wherein a second output node identifies that a plurality of parameters of the set of parameters of the first parameter type are to be adjusted,
wherein a third output node identifies that a second parameter of the set of parameters of a second parameter type is to be adjusted,
wherein a fourth output node identifies that a machine instance type is to be upgraded,
wherein the set of hidden layers includes a first hidden layer and a second hidden layer that each include at least five nodes, and
wherein the input layer is fully connected to the first hidden layer, the first hidden layer is fully connected to the second hidden layer, and the second hidden layer is fully connected to the output layer.

10. The system of claim 7, wherein the machine learning service is further configured for:
storing the budget information, pricing information, and performance information as historical information; and
training the machine learning model with the historical information.

11. The system of claim 7, wherein the resource allocation service is further configured for:
adjusting the resource by executing the reallocation instructions to apply the updated parameter to the set of containers by updating the parameter to the updated parameter,
wherein the reallocation instructions include one or more of adding a container to the set of containers, removing a container from the set of containers, adding processing to a container of the set of containers, reducing processing to the container, adding memory to the container, reducing memory to the container, and adding storage to the container.

12. The system of claim 7, wherein the resource allocation service is further configured for:
receiving the budget information from a client device, wherein the budget information includes a budget of the containerized application;
retrieving the pricing information by accessing an application program interface of a cloud service provider that hosts the containerized application,
wherein the pricing information includes a price for each machine instance type of the list of machine instance types,
wherein the machine instances of the set of machine instances each correspond with a same machine instance type of the list of machine instance types,
wherein each machine instance of the set of machine instances hosts a container of the set of containers,
wherein each machine instance type in the list of machine instance types identifies a type of virtual machine; and
receiving the performance information from a monitoring service hosted by the cloud service provider,
wherein the performance information includes a processor value, a memory value, a storage value, a latency value, and a traffic value for each container of the set of containers.

13. A non-transitory computer readable medium comprising computer readable program code for:
receiving budget information of a containerized application deployed with a set of containers to a set of machine instances;
receiving pricing information of a list of machine instance types;
receiving performance information of the set of containers;
receiving an alert generated based on the performance information by comparing the performance information to a set of thresholds;
generating, after receiving the alert, an output vector from a machine learning model, wherein the machine learning model uses the performance information;
determining the resource to update based on the output vector and the alert by:
comparing the output vector to the alert, and
generating an updated parameter from comparing the output vector to the alert, wherein the updated parameter is one of a processor limit, a memory limit, a storage limit, a heap size, and a container number limit;
determining an updated configuration cost by applying the pricing information to the updated parameter;
generating reallocation instructions by comparing the updated configuration cost to a budget goal from the budget information; and
adjusting a resource of the set of containers by updating a parameter based on the output vector in response to the alert,
wherein the resource is controlled by the parameter, and
wherein the parameter is identified in the alert.

14. The non-transitory computer readable medium of claim 13, further comprising computer readable program code for:
generating a set of input features from one or more of the budget information, the pricing information, and the performance information,
wherein the input features include a processor usage percentage, a memory usage percentage, a storage usage percentage, a latency percentage, and a traffic percentage.

15. The non-transitory computer readable medium of claim 14, further comprising computer readable program code for:
generating the output vector by applying the set of input features to a neural network,
wherein the neural network is the machine learning model,
wherein the neural network includes an input layer with five input nodes, a set of hidden layers, and an output layer with four output nodes that form the output vector,
wherein a first output node identifies that at least one parameter of a set of parameters of a first parameter type is to be adjusted,
wherein a second output node identifies that a plurality of parameters of the set of parameters of the first parameter type are to be adjusted,
wherein a third output node identifies that a second parameter of the set of parameters of a second parameter type is to be adjusted,
wherein a fourth output node identifies that a machine instance type is to be upgraded,
wherein the set of hidden layers includes a first hidden layer and a second hidden layer that each include at least five nodes, and
wherein the input layer is fully connected to the first hidden layer, the first hidden layer is fully connected to the second hidden layer, and the second hidden layer is fully connected to the output layer.

16. The non-transitory computer readable medium of claim 13, further comprising computer readable program code for:
storing the budget information, pricing information, and performance information as historical information; and
training the machine learning model with the historical information.

17. The non-transitory computer readable medium of claim 13, further comprising computer readable program code for:
adjusting the resource by executing the reallocation instructions to apply the updated parameter to the set of containers by updating the parameter to the updated parameter,
wherein the reallocation instructions include one or more of adding a container to the set of containers, removing a container from the set of containers, adding processing to a container of the set of containers, reducing processing to the container, adding memory to the container, reducing memory to the container, and adding storage to the container.

18. The non-transitory computer readable medium of claim 13, further comprising computer readable program code for:
receiving the budget information from a client device, wherein the budget information includes a budget of the containerized application;
retrieving the pricing information by accessing an application program interface of a cloud service provider that hosts the containerized application,
wherein the pricing information includes a price for each machine instance type of the list of machine instance types, wherein the machine instances of the set of machine instances each correspond with a same machine instance type of the list of machine instance types, wherein each machine instance of the set of machine instances hosts a container of the set of containers, wherein each machine instance type in the list of machine instance types identifies a type of virtual machine; and receiving the performance information from a monitoring service hosted by the cloud service provider, wherein the performance information includes a processor value, a memory value, a storage value, a latency value, and a traffic value for each container of the set of containers.

\* \* \* \* \*